United States Patent [19]

Wiltshire

[11] 4,101,254
[45] Jul. 18, 1978

[54] PREFORM MACHINE

[75] Inventor: Arthur J. Wiltshire, Richmond Heights, Ohio

[73] Assignee: Structural Fibers, Inc., Chardon, Ohio

[21] Appl. No.: 801,145

[22] Filed: May 27, 1977

[51] Int. Cl.² ............................................. B29J 5/00
[52] U.S. Cl. ................................. 425/82.1; 264/112; 264/128; 19/148
[58] Field of Search ............... 425/80, 82, 388; 19/156.3, 156.4, 148; 264/91, 109, 112, 128

[56] References Cited

U.S. PATENT DOCUMENTS

| | | | |
|---|---|---|---|
| 251,759 | 1/1882 | Baglin | 19/148 X |
| 3,170,197 | 2/1965 | Brenner | 425/80 X |
| 3,177,275 | 4/1965 | Brenner | 425/82 X |
| 3,654,002 | 4/1972 | Wiltshire et al. | 425/80 X |
| 3,674,599 | 7/1972 | Wiltshire | 425/80 |
| 3,791,783 | 2/1974 | Damon et al. | 425/82 |

Primary Examiner—Robert L. Spicer, Jr.
Attorney, Agent, or Firm—McNenny, Pearne, Gordon, Gail, Dickinson & Schiller

[57] ABSTRACT

A method and apparatus for forming a fiber preform for use in molding fiber-reinforced, plastic articles is disclosed. The apparatus includes a perforated form which is rotated about its longitudinal axis while a vacuum is applied internally. Cutters deposit short lengths of fibers on the rotating form by traversing the form from one end to another, and a binder resin is sprayed onto the fibers as they are deposited. The form is cylindrical and at least a major portion of its sidewall is initially covered with a flexible bellows. As the cutters traverse the form, the bellows is collapsed ahead of the cutters to incrementally expose the perforations. An oven is provided to cure the resin while the preform remains on the form.

16 Claims, 6 Drawing Figures

PREFORM MACHINE

BACKGROUND OF THE INVENTION

This invention relates generally to the manufacture of fiber-reinforced, plastic articles such as tanks or the like and, more particularly, relates to a novel method and apparatus for manufacturing fiber preforms for such articles.

In the manufacture of fiber-reinforced articles such as tanks and the like, one commonly used method includes the steps of forming two end preforms from fibers, such as glass fibers, and positioning them in a cylindrical mold with a rolled mat used for forming the tank sidewall. The fibers forming the preform and mat are then compressed by inflating a bag within the mold and then the fiber form is partially permeated with a thermosetting resin or the like. The bag is subsequently expanded by further inflation to compress the fiber form in such a manner as to distribute the resin through the fibrous form and achieve the results of pressure molding, while at the same time avoiding migration of the fibers and destruction of the laid-up form.

The above-described procedure is set forth in U.S. Pat. No. Re. 25,241 to Randolph. In the Randolph patent, the fiber form comprises a flat sheet of fiber matting which is wrapped into a cylindrical form to define the sidewall of a cylindrical tank. The top and bottom portions of the fiber form comprise preformed fiber caps. According to the teachings of Randolph, therefore, a longitudinal overlap or seam is formed by the sidewall matting and such a seam results in an unevenness in the amount of fiber-reinforcing material along the longitudinal, overlapping portion of the matting. Further, since the end preforms are separately formed, an overlapping joint is required between the sidwall mat and the preforms. Here again, an irregularity in the amount of reinforcing material is present at the overlapping joints. Still further, the lapping of the joints does not provide a uniform interlocking of the fibers in the area of the lap.

In order to overcome the above problems, a technique was disclosed for forming a fiber preform having a tubular section and an integral end thereon wherein the fibers forming the preform are uniformly distributed over the entire preform so that the final product provides a uniform high strength without excessive amounts of fibers in any location, and so that a finished article has not more than one seam. This technique is set forth in U.S. Pat. Nos. 3,654,002 and 3,736,086.

According to the procedure of those patents, an elongated screen form is rotated about its longitudinal axis. A vacuum is supplied to the interior of the screen form to draw air into the form while a large number of randomly oriented chopped pieces of fiber are directed against the rotating form by a roving cutter which traverses the length of the form. The cutter is followed by a thermosetting resin binder spray to lock the fibers in place. The binder-impregnated fibers are then subjected to heat to cure the binder and to produce a preform having a cylindrical sidewall and an integral end cap. Although this technique overcomes the problems associated with a plurality of lap seams, and reduces the expense of the form by eliminating the need for sidewall matting, it has been found that a considerable portion of the fibers is lost, since the screen form does not capture all of the fibers on its sidewall.

Probably as important is the fact that it is impossible to maintain a uniform wall thickness, on the preform. The chopped fiber is initially deposited by the roving cutter on the portion of the screen nearest the applied vacuum, and then the cutter traverses the longitudinal extent of the preform screen until it deosits fibers on the closed end of the screen. Monometer readings along the extent of the screen indicate a drop in vacuum as the cutter approaches the closed end of the screen, and while the deposited fibers tend to promote suction through the perforations which are not yet deposited with fibers, the fibers tend to be compacted more at the open end of the preform. Thus, while the amount of fibers is uniform at any given location along the sidewall of the preform, the thickness of the preform varies due to differences in compacting pressures. When such a preform is laid up within a mold and impregnated with resin, the fiber-to-resin ratio varies from a relatively high value at the open end of the tank to a relatively low value at the closed end of the tank. The desired objective in producing a tank or pressure vessel is to have a uniform glass-to-resin ratio throughout the tank or vessel, such as for example 40% fibers and 60% resin.

SUMMARY OF THE INVENTION

This invention overcomes many of the problems associated with techniques according to the above-identified patents. Specifically, this invention permits the fabrication of fiber preforms having a substantially uniform wall thickness and fiber density throughout. According to this invention, a perforated form is rotated about its longitudinal axis while a vacuum is applied internally. At least a major portion of the sidewall of the form is initially covered with a flexible sleeve or bellows and a pair of cutters cut fiberreinforcing material, such as glass fibers, into short lengths and direct the fibers toward the closed end of the rotating form. The cutters then traverse the cylindrical sidewall of the form as the flexible sleeve or bellows is retracted in advance of the traversing cutters. The sleeve, therefore, promotes a substantially uniform suction at the progressing junction between the end of the sleeve and the perforations. The sleeve or bellows is linked to the mechanism which advances the cutters so that the sleeve and cutters move as a unit.

DETAILED DESCRIPTION OF THE INVENTION

Figure 1:
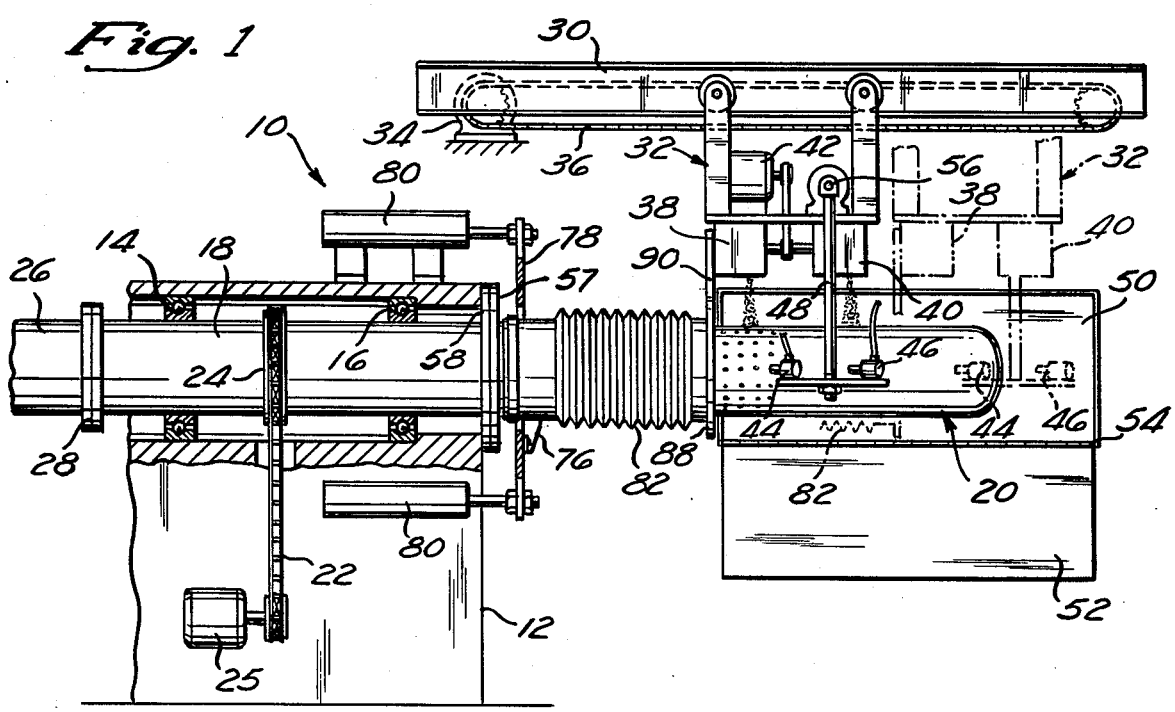
FIG. 1 is a schematic, side elevation of a machine incorporating this invention.

Referring now to the drawings, and particularly to FIG. 1, there is illustrated a preform machine 10 in accordance with this invention. The machine 10 includes a frame 12 which supports spaced bearings 14 and 16, which journal a rotatable, tubular form supporting duct 18. A perforated screen form 20 is mounted on the end of the tubular duct 18 for rotation therewith. A drive chain 22 is connected to a sprocket 24 on the tubular duct 18 and is driven by a motor 25 to provide the mode of power for rotating the tubular duct 18. To the end of the tubular duct 18 opposite the form 20 is connected a nonrotating duct 26 through a coupling 28, which provides an airtight joint therebetween while permitting relative rotation. The duct 26 connects to a fan (not shown) driven by a motor (not shown) so that the fan applies a vacuum to the perforations of the form 20.

Mounted on a track 30 which extends above the form 20 is a carriage 32 which is supported by the track 30 for traversing movement along the length of the form 20 in a path parallel to the longitudinal axis of the form 20. A motor 34 is connected through a chain 36 to provide the power for traversing the carriage 32. Mounted on the carriage 30 are two similar sources of chopped fibers which in the illustrated embodiment comprise cutters or choppers 38 and 40. The cutters are spaced from each other in the direction of the length of the form 20. A single motor 42 is connected to drive the two cutters through suitable clutches. The cutters 38 and 40 operate to cut continuous filaments or rovings of fiberglass or the like into short lengths to form the separated pieces of fiber and operate to direct the cut pieces downwardly against the form 20, as is illustrated in FIG. 1. Also mounted on the carriage 32 are a pair of airless spray guns or nozzles 44 and 46, which are supported by an arm 48. These nozzles 44 and 46 are adapted to spray a settable binder resin onto the exterior of the form in the area in which the cutters 44 and 46 are depositing cut fibers.

Positioned beside the form 20 is a curing oven which can be closed around the form after the fiber and resin are deposited thereon to heat the resin and cure it before the preform is removed from the machine. The oven includes a burner box 50 mounted beside the form 20. Pivotally mounted on the burner box 50 is a lower cover 52 pivoted at 54 for movement between retracted and extended positions. The cover and the burner box are adapted to completely enclose the form and the fiber is deposited thereon to cure the binder resin afrer the arm 48 is swung out of the way about a pivot 56. These elements are described in greater detail in U.S. Pat. Nos. 3,654,002 and 3,736,086, the disclosure of which is incorporated herein by reference.

Figure 4:
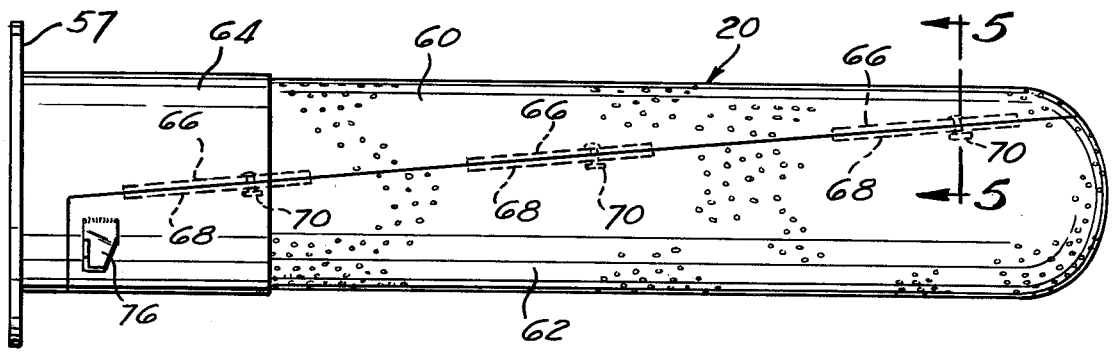
FIG. 4 is a side elevation of a screen form.
Figure 5:
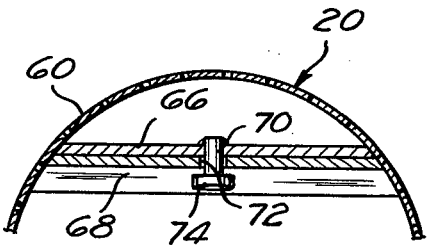
FIG. 5 is an enlarged, fragmentary, cross sectional view, the plane of the section being indicated by the line 5—5 in FIG. 4.
Figure 6:
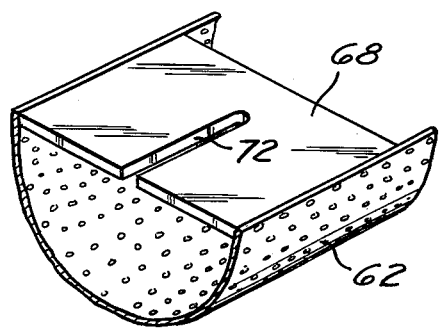
FIG. 6 is a fragmentary, perspective view of one part of the form illustrated in FIG. 4.

FIGS. 4 through 6 disclose one preferred embodiment of a form structure which may be used with the machine. This form includes a mounting flange 57 which is secured to a flange 58 of the rotating duct 18. The form includes two parts 60 and 62 which cooperate, when the two parts are in the position illustrated in FIG. 4, to produce the cylindrical portion and the generally spherical end wall portion of the form. The upper part 60 is rigidly mounted on a sleeve 64 associated with the flange 57, and the lower part is supported by the upper part by inclined connectors (best illustrated in FIGS. 5 and 6). These connectors include an upper plate 66 and a lower plate 68. The upper plates are secured to the upper part 60 at spaced locations and the lower plates 68 are secured to the lower part 62 at similar spaced locations. Mounted on the upper plates 66 are headed fasteners 70, which extend through slots 72 in the lower plates 68 and are provided with heads 74 which hold the plates together. Therefore, the two parts 60 and 62 are held together along an inclined plane, but are axially movable relative to each other. The lower part 62 is provided with peripherally spaced, lateral projections 76 (only one of which is shown), which are bolted to a stripper ring 78.

The stripper ring is extended by actuators 80, which causes the lower part 62 to move along the upper part 60 to a location where the combined peripheral extent of the upper and lower parts is reduced and the preform may be easily removed from the machine.

Figure 2:
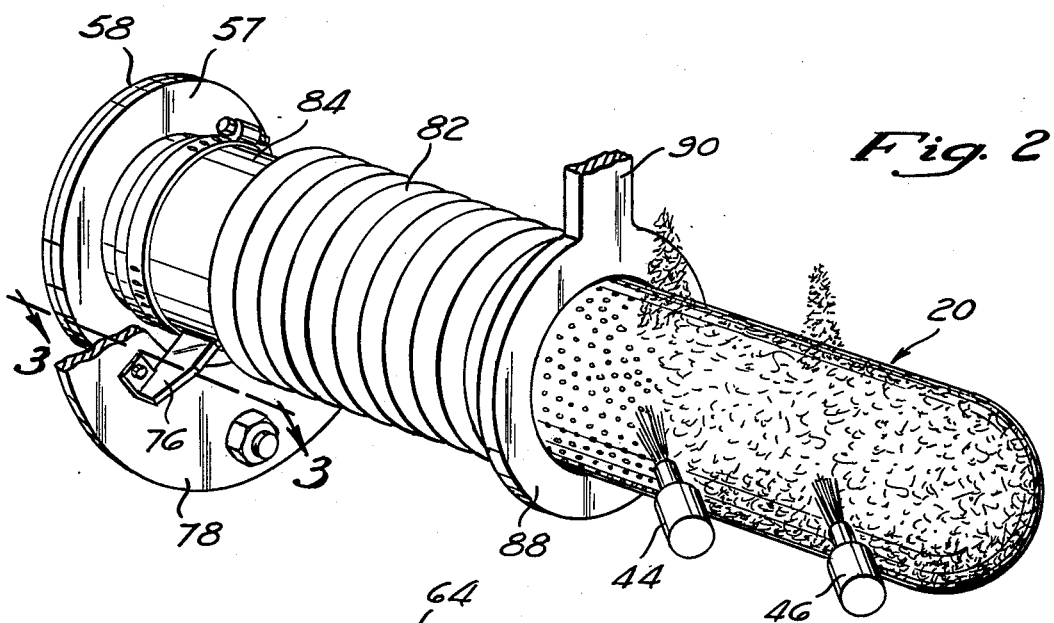
FIG. 2 is a fragmentary perspective of a portion of the machine showing chopped fibers and binder resin being applied to a rotating screen form.
Figure 3:
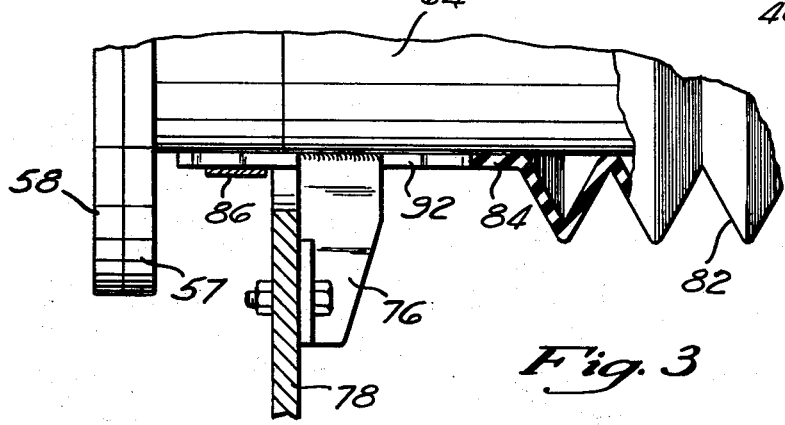
FIG. 3 is a fragmentary view of a portion of the screen form and sleeve illustrated in FIG. 2, partially in section.

Referring again to FIGS. 1 to 3, a flexible sleeve or bellows 82 is mounted on the tube 64 and is movable from an extendable position, shown in phantom outline in FIG. 1, to a collapsed or stored position wherein the entire sleeve or bellows is retracted to expose all of the cylindrical sidewall of the form. The bellows 82 may be made from rubber or neoprene, and has an uncorrugated end portion 84 which tightly embraces the tube 64. That portion 84 is securely clamped to the tube 64 by a band 86 which is similar to a conventional hose clamp. The other end of the bellows 82 is connected to a ring 88 and the ring 88 is fixed to the carriage 32 by an extension 90. To permit the lateral projections 76 to move relative to the clamped portion 84, slots 92 are provided in the portion 84, as may be seen in FIG. 3.

The machine is preferably controlled by a suitable automated control system to automatically operate through a predetermined cycle. Suitable limit switches and control circuits are provided for this automated operation. However, the circuitry is not illustrated, since persons skilled in the art can easily provide suitable circuits to produce the desired operational cycle.

At the beginning of a cycle, the fan is energized to apply a vacuum to the perforations of the form 20. The motor 25 is energized to cause rotation of the form and the carriage 42 is traversed to the right, as viewed in FIG. 1, until the cutters and spray guns are in their phantom line position.

The operation of the cutter 38 and the spray gun 44 is initiated to cause continuous filaments to be fed from a roving cake (not shown) to the cutter, where the continuous filaments are chopped into short lengths of fiber. Such cutters are conventional and well known in the art. In the phantom outline position of the carriage illustrated in FIG. 1, the cutters act to deposit fibers on the end of the form 20 and on a portion of its sidewall. The cutter 40 and the spray gun 46 are energized as they approach the closed end of the form. Adequate suction is provided, since the sleeve 82 covers at least a major portion of the perforations in the form 20.

The deposit of fibers from the cutter 38 at the closed end of the form occurs for a predetermined length of time before the traversing motor 34 is started to cause the carriage to traverse toward the open end of the form. This ensures that a sufficient layer of fibers will be deposited at the closed end of the form. The motor 34 is then energized to cause the carriage to traverse to the left, as viewed in FIG. 1, toward the open end of the form. While the carriage moves to the left, the sleeve 82 is collapsed to progressively expose perforations to the chopped fibers and to ensure that an adequate and uniform vacuum occurs as the fibers are deposited on the form. The carriage 32 continues to traverse along the form, depositing the fibers thereon toward the open end of the form. Since the cutter 40 traverses behind the cutter 38, two separate applications of fiber and resin are supplied to the form to ensure that a uniform thickness will be produced in the wall of a preform. When the cutter 38 reaches the end of the perforated form 20, it is de-energized along with the spray gun 44. The carriage continues to travel, however, until the cutter 40 and the spray gun 46 reach the end of their travel and then the cutter 40 and the spray gun 46 are deenergized.

The spray guns are moved up out of the way by movement of the arm 48 to a horizontal position. The oven is then caused to surround the preform so that heat may be applied to cure the binder resin. After the resin is cured, the oven is opened, and the actuators 80 are then operated to permit removal of the finished preform from the form 20.

Although a preferred embodiment of this invention is illustrated, it is to be understood that various modifications and rearrangements of parts may be resorted to without departing from the scope of the invention.

What is claimed is:

1. A method of manufacturing a preform for fiber-reinforced, plastic articles, comprising the steps of rotating about its longitudinal axis an elongated, cylindrical, hollow tube having a cylindrical sidewall and a closed end and having perforations in its entire outer surface including said end, blocking the perforations in at least a major portion of said cylindrical sidewall, applying vacuum to the inside of said form to draw air through unblocked perforations in said end, while said vacuum is applied, directing a large number of randomly oriented, short pieces of fiber against the outside surface of said end by a source of fibers, progressively unblocking the perforations and as the perforations are unblocked uniformly traversing the length of said form with said source, spraying said fibers with a thermosetting resin to bind said fibers together to form a preform without filling the voids between said fibers, and curing said resin while said preform remains on said form.

2. A method of manufacturing a preform as set forth in claim 1, wherein said perforations are blocked by a collapsible sleeve covering said portion of said sidewall, and are unblocked by sliding said sleeve along said cylindrical sidewall away from said closed end.

3. A method of manufacturing a preform as set forth in claim 2, wherein said sleeve is a flexible bellows.

4. A method of manufacturing a preform as set forth in claim 1, wherein at least two sources of fibers are provided and both sources traverse said form in the same direction.

5. A method of forming a preform as set forth in claim 4, wherein long strands of fibers are cut into short pieces by said source.

6. A method of forming a preform as set forth in claim 1, wherein said form is subsequently collapsed to permit removal of said preform.

7. A machine for making preforms for fiber-reinforced, plastic articles, comprising a frame, an elongated form journalled on said frame for rotation about its longitudinal axis, said form having a cylindrical sidewall and an end wall and being provided with perforations in its outer surface, means to apply a vacuum to said perforations, fiber-dispensing means mounted to traverse the length of said form along a path which is uniformly spaced from the cylindrical sidewall of said form and deposit fibers on the outer surface thereof, means to drive said fiber-dispensing means along said path, means to coat said fibers with a settable resin without filling the voids therebetween, and means to block the perforations on said cylindrical sidewall and to progressively unblock said perforations as said fiber-dispensing means traverses the length of said form.

8. A machine as set forth in claim 7, wherein said means to block and unblock said perforations comprises a flexible sleeve covering said sidewall and being adapted to be retracted away from said closed end of said form.

9. A machine as set forth in claim 8, wherein said sleeve is a bellows.

10. A machine for making preforms for fiber-reinforced, plastic articles, comprising a frame, an elongated form journalled on said frame for rotation about its longitudinal axis, said form having a cylindrical sidewall and an end wall and being provided with perforations in its outer surface, means to apply a vacuum to said perforations, carriage means mounted substantially parallel to the longitudinal axis of said form, fiber-dispensing means mounted on said carriage means to traverse the length of said form along a path which is uniformly spaced from the cylindrical sidewall of said form and deposit fibers on the outer surface thereof, means to drive said fiber-dispensing means along said path, means to coat said fibers with a settable resin without filling the voids therebetween, flexible sleeve means covering the cylindrical sidewall of said form, means connecting said sleeve to said carriage means and being driven by the drive for said fiber-dispensing means so that said sleeve is collapsed to progressively expose said perforations slightly in advance of the travel of the fiber-dispensing means.

11. A machine as set forth in claim 7, wherein said resin is thermosetting, and heating means are provided to cure said resin while said fibers remain on said form.

12. A machine as set forth in claim 7, wherein said form is collapsible to permit said preform to be removed therefrom.

13. A machine as set forth in claim 12, wherein power means are provided to collapse said form.

14. A machine as set forth in claim 7, wherein said fiber-dispensing means includes two cutters operable to sequentially traverse said form in the same direction.

15. A machine as set forth in claim 7, wherein said means for coating said fibers is a spray device which traverses said form with said fiber dispensing means and coats the fibers deposited on said form by said fiber-dispensing means.

16. A machine as set forth in claim 7, wherein said form includes two mating parts joined together along a diagonally extending plane which cooperate to form a cylindrical outer surface when in one position, said two parts being longitudinally movable relative to each other to reduce the diameter of said form and permit removal of a preform therefrom.

* * * * *